US009989752B2

(12) United States Patent
Jung et al.

(10) Patent No.: US 9,989,752 B2
(45) Date of Patent: Jun. 5, 2018

(54) ELECTROWETTING DEVICE

(75) Inventors: Kwang-Chul Jung, Seongnam-si (KR);
Seong Gyu Kwon, Suwon-si (KR);
Mee Hye Jung, Suwon-si (KR)

(73) Assignee: Amazon Technologies, Inc., Seattle, WA (US)

( * ) Notice: Subject to any disclaimer, the term of this patent is extended or adjusted under 35 U.S.C. 154(b) by 494 days.

(21) Appl. No.: 13/609,744

(22) Filed: Sep. 11, 2012

(65) Prior Publication Data
US 2013/0271817 A1  Oct. 17, 2013

(30) Foreign Application Priority Data

Apr. 17, 2012  (KR) .................. 10-2012-0039776

(51) Int. Cl.
*G02B 26/00* (2006.01)
*G02B 3/12* (2006.01)

(52) U.S. Cl.
CPC ......... *G02B 26/005* (2013.01); *G02B 26/004* (2013.01); *G02B 3/12* (2013.01); *G02B 26/002* (2013.01)

(58) Field of Classification Search
CPC .... G02B 26/004; G02B 26/005; G02B 26/02; G02B 3/12; G02B 2207/115; G02B 26/00; H01L 29/7869; G02F 1/133345
USPC ........ 359/665–666, 290–291, 295, 228, 253, 359/254; 349/144
See application file for complete search history.

(56) References Cited

U.S. PATENT DOCUMENTS

| | | | |
|---|---|---|---|
| 7,359,108 B2 | 4/2008 | Hayes et al. | |
| 7,812,809 B2 | 10/2010 | Choi et al. | |
| 7,847,996 B2 | 12/2010 | Chen et al. | |
| 7,864,439 B1* | 1/2011 | Hickerson ............ | G02B 26/005 359/666 |
| 7,876,506 B2 | 1/2011 | Chen et al. | |
| 2007/0070278 A1* | 3/2007 | Do et al. ........................ | 349/129 |
| 2007/0291210 A1* | 12/2007 | Cho .................. | G02F 1/133514 349/129 |
| 2008/0169195 A1 | 7/2008 | Jones et al. | |

(Continued)

FOREIGN PATENT DOCUMENTS

KR    10-2007-0097810 A    10/2007
KR    1020080004982 A    1/2008

(Continued)

OTHER PUBLICATIONS

Korean Office Action dated Feb. 7, 2018 for Korean Patent Application No. 10-2012-0039776.

*Primary Examiner* — Ricky Mack
*Assistant Examiner* — Daniele Manikeu
(74) *Attorney, Agent, or Firm* — EIP US LLP

(57) ABSTRACT

An electrowetting device is provided that includes a lower substrate and an upper substrate facing each other, a first electrode positioned on the lower substrate, an edge electrode positioned on the lower substrate and adjacent to an edge of the first electrode, a hydrophobic insulating layer positioned on the first electrode and the edge electrode, a partition positioned on the lower substrate, a second electrode positioned on the upper substrate, and a first liquid and a second liquid positioned between the upper substrate and the lower substrate, wherein an electric field of a portion where the edge electrode is positioned is smaller than an electric field of a portion where the first electrode is positioned.

21 Claims, 8 Drawing Sheets

(56) References Cited

U.S. PATENT DOCUMENTS

| | | | |
|---|---|---|---|
| 2008/0296566 A1* | 12/2008 | Song | H01L 51/0545 257/40 |
| 2008/0304135 A1 | 12/2008 | Van Delden et al. | |
| 2009/0027317 A1 | 1/2009 | Cheng et al. | |
| 2009/0046082 A1 | 2/2009 | Jacobson et al. | |
| 2009/0058840 A1* | 3/2009 | Lee et al. | 345/204 |
| 2009/0316102 A1* | 12/2009 | Cho et al. | 349/144 |
| 2009/0316253 A1* | 12/2009 | Fairley | G02B 26/004 359/292 |
| 2010/0149651 A1* | 6/2010 | Berge et al. | 359/666 |
| 2010/0157410 A1* | 6/2010 | Kim et al. | 359/291 |
| 2010/0302615 A1* | 12/2010 | Aubert et al. | 359/290 |
| 2011/0058245 A1 | 3/2011 | Wang et al. | |
| 2011/0068388 A1* | 3/2011 | Yamazaki et al. | 257/329 |
| 2011/0084944 A1 | 4/2011 | Bae | |
| 2011/0227080 A1* | 9/2011 | Roh | G02B 26/005 257/59 |
| 2013/0100386 A1* | 4/2013 | Kim | G02F 1/133512 349/110 |

FOREIGN PATENT DOCUMENTS

| | | |
|---|---|---|
| KR | 100873283 | 12/2008 |
| KR | 10-2010-0107005 A | 10/2010 |
| KR | 1020110057771 A | 6/2011 |
| KR | 1020110074087 A | 6/2011 |
| KR | 10-2011-0116506 A | 10/2011 |

\* cited by examiner

ELECTROWETTING DEVICE

CROSS-REFERENCE TO RELATED APPLICATION

This application claims priority to Korean Patent Application No. 10-2012-000039776 filed in the Korean Intellectual Property Office on Apr. 17, 2012, the entire contents of which are herein incorporated by reference.

TECHNICAL FIELD

Embodiments of the present invention relate to an electrowetting device.

DISCUSSION OF THE RELATED ART

Examples of flat panel displays include liquid crystal displays (LCDs), plasma display panel (PDP) displays, field emission displays (FEDs), electroluminescent display (ELD) devices, and electrowetting display (EWD) devices.

The electrowetting display device visually expresses information by using an electrowetting phenomenon in which the interfacial tension of a fluid is migrated or deformed by an electric field. The electrowetting display device, which includes pixels containing a hydrophilic liquid and a hydrophobic liquid, may display an image as the interface tension of the hydrophilic liquid is changed by an electric field so that the hydrophobic liquid is moved. The electrowetting display device may have a small size, low power consumption, fast response speed, and high color brightness.

However, the later visibility of the electrowetting display device may be changed according to a direction in which the hydrophobic liquid is gathered.

SUMMARY

The embodiments of the present invention provide an electrowetting device with improved lateral visibility.

An electrowetting device according to an exemplary embodiment of the present invention includes a lower substrate and an upper substrate facing each other, a first electrode positioned on the lower substrate, an edge electrode positioned on the lower substrate and adjacent to an edge of the first electrode, a hydrophobic insulating layer positioned on the first electrode and the edge electrode, a partition positioned on the lower substrate, a second electrode positioned on the upper substrate, and a first liquid and a second liquid positioned between the upper substrate and the lower substrate, wherein the first electrode and the edge electrode are configured so that an electric field is weaker at a region adjacent to the edge electrode than at a region adjacent to the first electrode.

The edge electrode may be applied with the same voltage as a voltage that is applied to the second electrode.

The edge electrode may be positioned at the same layer as the first electrode.

The edge electrode may be positioned along the partition.

The first liquid may be positioned along the edge electrode when the first electrode and the second electrode are applied with a voltage.

The first electrode and the edge electrode may be separated from each other.

A thin film transistor positioned on the lower substrate and a color filter positioned on the thin film transistor may be further included, and the first electrode and a terminal of the thin film transistor may be connected with each other through a first contact hole formed through the color filter.

A storage electrode positioned on the lower substrate may be further included, and the storage electrode may be electrically connected to the edge electrode.

The edge electrode and the storage electrode may be connected with each other through a second contact hole formed through the color filter.

A planarization layer positioned on the color filter may be further included.

The first liquid may include oil, and the second liquid may include a water-soluble fluid.

An electrowetting device according to an exemplary embodiment of the present invention includes: a lower substrate and an upper substrate facing each other; an insulating layer positioned on the lower substrate; a first electrode positioned on the lower substrate; a hydrophobic insulating layer positioned on the first electrode; a partition positioned on the lower substrate; a second electrode positioned on the upper substrate; and a first liquid and a second liquid positioned between the upper substrate and the lower substrate, wherein the insulating layer includes a trench formed at a region adjacent to an inner edge portion of the partition.

The first liquid may be positioned along the trench when a voltage is applied to the first electrode and the second electrode.

The trench may be positioned along the partition.

An electric field is weaker at a region adjacent to the trench than at a region adjacent to the first electrode.

The insulating layer may include a color filter.

A planarization layer positioned on the color filter may be further included.

A color filter positioned on the lower substrate may be further included, and the insulating layer may be positioned on the color filter.

An edge electrode positioned on the lower substrate and adjacent to one corner of the first electrode may be further included, and the edge electrode may be separated from the first electrode.

A thin film transistor positioned on the lower substrate and a color filter positioned on the thin film transistor may be further included, and the first electrode and one terminal of the thin film transistor may be connected with each other through a first contact hole formed through the color filter.

A storage electrode positioned on the lower substrate may be further included, and the storage electrode may be electrically connected to the edge electrode.

The edge electrode and the storage electrode may be connected with each other through a second contact hole formed through the color filter.

A planarization layer positioned on the color filter may be further included.

The first liquid may include oil, and the second liquid may include a water-soluble fluid.

According to an embodiment, there is provided an electrowetting device including a first substrate, a second substrate facing the first substrate, a first electrode on the first substrate, a second electrode on the first substrate, wherein the second electrode is spaced apart from the first electrode, a third electrode on the second substrate, an insulating layer on the first and second electrodes, a fluid layer between the third electrode and the insulating layer, wherein the liquid layer includes a first fluid and a second fluid, and a partition on the insulating layer in the fluid layer, the partition having first and second walls opposite to each other, the first fluid trapped between the first and second walls of the partition, wherein when an electric field is applied to the fluid layer, the first fluid is biased toward the first and second walls of the partition.

The second electrode surrounds at least a portion of the first electrode.

The electrowetting device further includes a trench along at least the first and second walls of the partition.

According to an exemplary embodiment of the present invention, oil can be gathered evenly at the right and left sides of each pixel, thus resulting in an increase in lateral visibility. The oil can prevent light leakage, thus resulting in a decrease in a width of the light blocking member. Thus, transmittance can be increased.

DETAILED DESCRIPTION OF THE EMBODIMENTS

Figure 1:
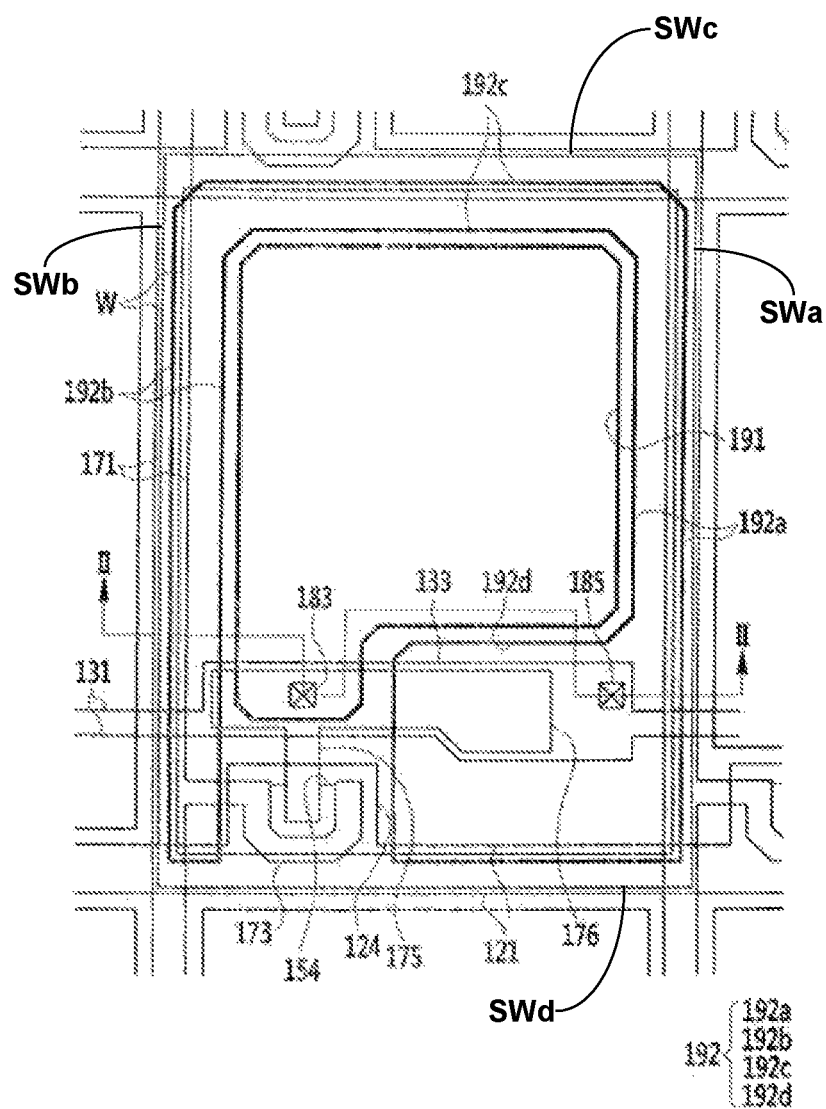
FIG. 1 is a top plan view illustrating an electrowetting device according to an exemplary embodiment of the present invention.

The embodiments of the present invention will be described in more detail hereinafter with reference to the accompanying drawings. However, it is to be understood that the invention is not limited to the disclosed embodiments, but, on the contrary, is intended to cover various modifications. As those skilled in the art would realize, the described embodiments may be modified in various different ways, all without departing from the spirit or scope of the present invention.

In the drawings, the thickness of layers, films, panels, regions, etc., may be exaggerated for clarity. It will be understood that when an element such as a layer, film, region, or substrate is referred to as being "on" another element, it can be directly on the other element or intervening elements may also be present. Like reference numerals may designate like or similar elements throughout the specification and the drawings.

Figure 2:
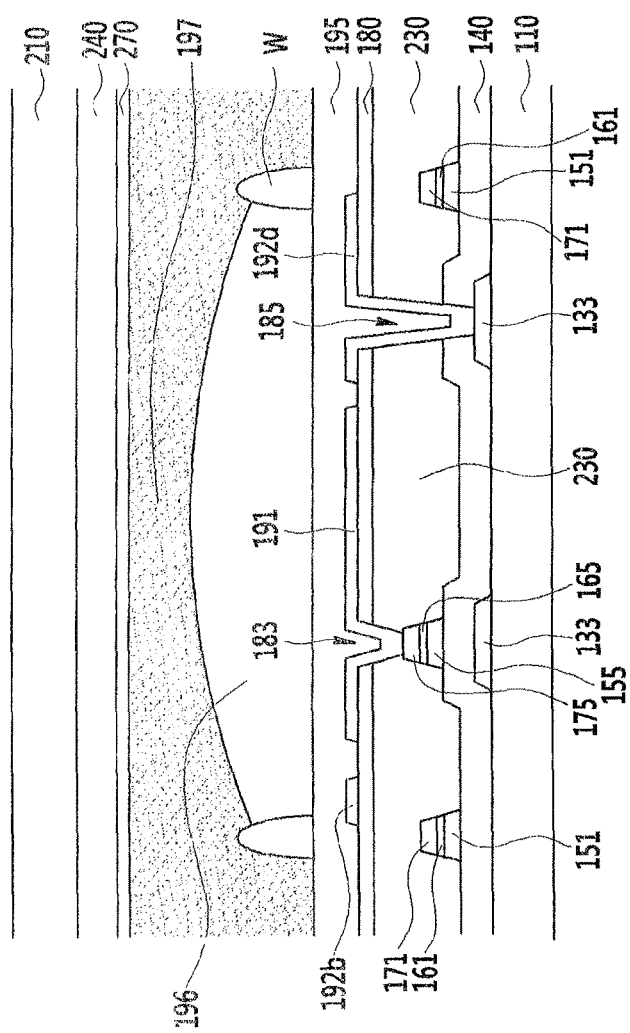
FIG. 2 is a cross-sectional view taken along the line II-II of FIG. 1.

FIG. 1 is a top plan view illustrating an electrowetting device according to an exemplary embodiment of the present invention. FIG. 2 is a cross-sectional view taken along the line II-II of FIG. 1.

Referring to FIG. 1 and FIG. 2, a gate line 121 and a storage electrode line 131 are formed on a lower substrate 110.

The gate line 121 through which a gate signal is transmitted extends substantially in a horizontal direction. The gate line 121 includes a gate electrode 124 protruding upward. The storage electrode line 131 extends parallel or substantially parallel to the gate line 121 and includes a storage electrode 133 having a relatively wide width. According to alternative embodiments, the shape and arrangement of the storage electrode line 131 vary.

A gate insulating layer 140 is formed on the gate line 121 and the storage electrode line 131, and semiconductor layers 151, 154, and 155 are formed of amorphous silicon, polycrystalline silicon, or an oxide semiconductor on the gate insulating layer 140. The semiconductor layers 151, 154, and 155 include a semiconductor stripe 151 extending in a longitudinal direction, a semiconductor layer 154 protruded from the semiconductor stripe 151 toward the gate electrode 124, and a semiconductor layer 155 overlapping the drain electrode 175.

According to an embodiment, ohmic contacts 161 and 165 are formed on the semiconductor layers 151 and 155, respectively, and an ohmic contact is formed on the semiconductor layer 154. Alternatively, when the semiconductor layers are formed of an oxide semiconductor, the ohmic contacts are omitted. According to an embodiment, the ohmic contacts are formed of a material, such as silicide or n+ hydrogenated amorphous silicon doped with a high-concentration of an n-type impurity.

A data line 171, a source electrode 173 connected to the data line 171, and a drain electrode 175 facing the source electrode 173 are formed on the ohmic contacts and the gate insulating layer 140.

The data line 171 through which a data signal is transmitted extends in the longitudinal direction and intersects the gate line 121 and the storage electrode line 131. The source electrode 173 extends toward the gate electrode 124 and is bent in a "U" shape, and the source electrode 173 faces the drain electrode 175, with the gate electrode 124 between the source and drain electrodes 173 and 175.

The drain electrode 175 extends upward from one end thereof, which is enclosed by the source electrodes 173. Another end of the drain electrode 175 has an expansion 176 with a relatively wide area. The expansion 176 connects the drain electrode 175 to another layer.

According to an embodiment, the source electrode 173 has a "U" shape that is rotated 90° leftward or rightward or has a "C" shape. The shape and the arrangement of the data line 171 and the drain electrode 175 are formed to correspond to the lying U-shaped source electrode 173. Alternatively, the data line 171, the source electrode 173, and the drain electrode 175 have various shapes and arrangements.

A gate electrode 124, a source electrode 173, a drain electrode 175, and a protruded semiconductor layer 154 form a thin film transistor, and a channel of the thin film transistor is formed in the protruded semiconductor layer 154 between the source electrode 173 and the drain electrode 175.

The protruded semiconductor layer 154 includes an exposed portion that is not covered by the source electrode 173 and the drain electrode 175 between the source electrode 173 and the drain electrode 175.

An organic layer 230 is formed on the data line 171, the source electrode 173, the drain electrode 175, and the exposed portion of the semiconductor layer 154. According to an embodiment, the organic layer 230 includes a color filter.

The color filter 230 is positioned on the region except where the thin film transistor is positioned. According to an embodiment, the color filter 230 extends long in the longitudinal direction between the neighboring data lines 171.

According to an embodiment, a lower passivation layer is formed of silicon nitride or silicon oxide between the data line 171, source electrode 173, drain electrode 175, and exposed semiconductor layer 154, and the organic layer 230.

A passivation layer 180 is formed on the organic layer 230. The passivation layer 180 is formed of an inorganic material or an organic material having photosensitivity. When the passivation layer 180 is formed on an organic material, according to an embodiment, the passivation layer 180 includes a planarization layer to planarize an underlying layer of the passivation layer 180, and when the passivation layer 180 is formed of an inorganic material, the passivation layer 180 increases transmittance by compensating for a refractive index or blocks a gas exhausted from the organic layer 230. Alternatively, the passivation layer 180 is omitted.

The passivation layer 180 and the organic layer 230 have a first contact hole 183 exposing the drain electrode 175 and a second contact hole 185 exposing the storage electrode 133.

A first electrode 191 and an edge electrode 192 are formed on the passivation layer 180. According to an embodiment, the first electrode 191 and the edge electrode 192 are formed of a transparent conductive material, such as ITO (indium tin oxide), IZO (indium zinc oxide), and IGZO (indium gallium zinc oxide). According to an embodiment, the first electrode 191 and the edge electrode 192 may be formed of the same layer.

The first electrode 191 is connected to the drain electrode 175 through the first contact hole 183, and the edge electrode 192 is connected to the storage electrode 133 through the second contact hole 185.

The edge electrode 192 is positioned near an edge of the first electrode 191 and is separated from the first electrode 191, and has a shape enclosing the edge of the first electrode 191. The edge electrode 192 includes first portions 192a and 192b extending in a direction parallel to the data line 171, a second portion 192c connecting the first portions to each other, and a third portion 192d connected to the storage electrode 133 through the second contact hole 185.

The edge electrode 192 is applied with the same voltage as a second electrode 270 positioned on an upper substrate 210.

A hydrophobic insulating layer 195 is formed on the first electrode 191.

An overcoat 240 is formed on the upper substrate 210 that faces the lower substrate 110. The second electrode 270 is positioned on the overcoat 240.

According to an embodiment, the lower substrate 110 and the upper substrate 210 are formed of transparent glass or plastic.

A first liquid 196 and a second liquid 197 are interposed between the lower substrate 110 and the upper substrate 210. The first liquid 196 is non-polar and non-conductive, and the second liquid 197 is conductive, so that the first and second liquids 196 and 197 are not mixed. The second liquid 197 has electrical conductivity.

According to an embodiment, the first liquid 196 includes black oil, and the second liquid 197 includes ultrapure water including a small amount of an electrolyte.

A partition W partitioning a pixel from other pixels is formed between the lower substrate 110 and the upper substrate 210. For convenience of description, only one pixel is shown in FIG. 1. Partition W comprises four sidewalls SWa, SWb, SWc, and SWd that are at four edges of the pixel, respectively. According to an embodiment, the partition W is formed of an insulating material having a hydrophilic characteristic. The partition W receives the first liquid 196 and the second liquid 197. The partition W prevents movement of the first liquid 196 between the pixels. The edge electrode 192 is positioned along the partition W.

The hydrophobic insulating layer 195 positioned on the first electrode 191 has a hydrophobic characteristic and thus repels the second fluid 197 which is a polar liquid, such that the first fluid 196 is positioned between the second fluid 197 and the hydrophobic insulating layer 195. The partition W is hydrophilic such that the second fluid 197 is attracted to the surface of the partition W. Accordingly, the second fluid 197 is repelled by the hydrophobic insulating layer 195 and is attracted to the partition W, and accordingly the first fluid 196 enclosed by the second fluid 197 may maintain a lens shape.

Figure 3:
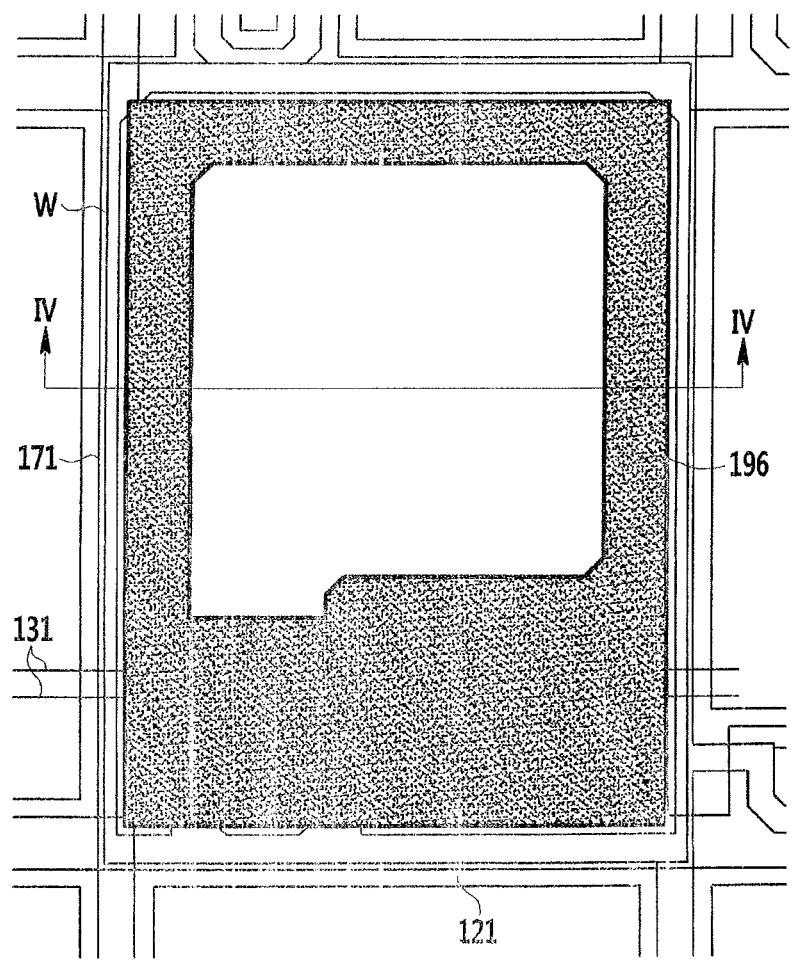
FIG. 3 is a top plan view illustrating an electrowetting device when an electric field is applied to the electrowetting device of FIG. 1.
Figure 4:
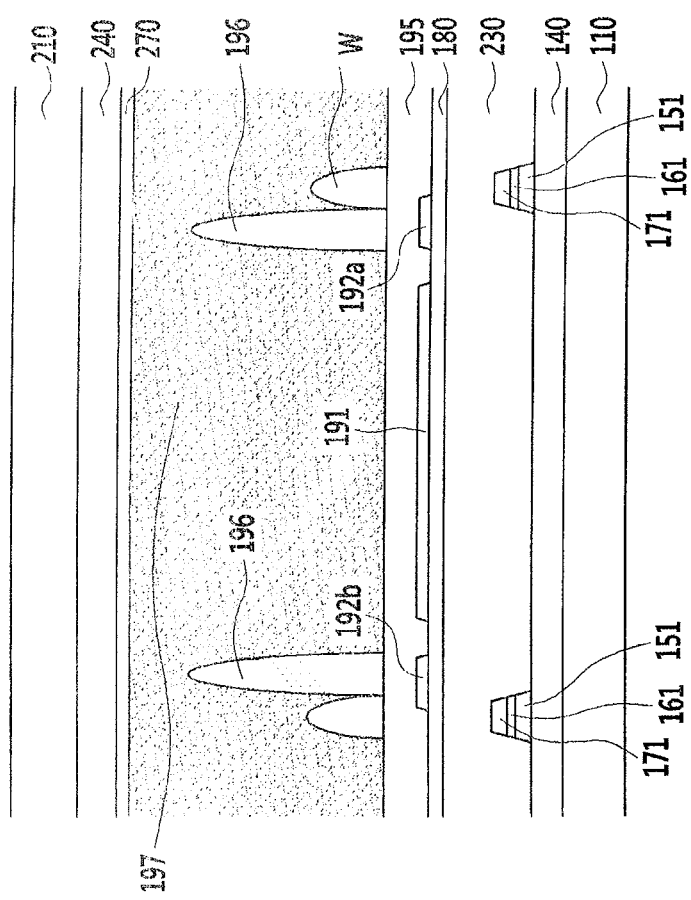
FIG. 4 is a cross-sectional view taken along the line IV-IV of FIG. 3.

FIG. 3 is a top plan view illustrating an electrowetting device when an electric field is applied to the electrowetting device of FIG. 1. FIG. 4 is a cross-sectional view taken along the line IV-IV of FIG. 3.

Referring to FIG. 3 and FIG. 4, when the first electrode 191 and the second electrode 270 are applied with voltages, the second fluid 197 is moved to contact a portion of the hydrophobic insulating layer 195, and thereby the first fluid 196 is pushed by the second fluid 197 and is collected near the partition W. Accordingly, light incident from an outside source and passing through the first substrate 110, the first electrode 191, and the hydrophobic insulating layer 195 does not pass through the first fluid 196 such that light of the color corresponding to the first fluid 196 is not generated.

The first fluid 150 moves or deforms when applied with an electric field, thereby blocking and unblocking incident light. For example, the first fluid functions as a shutter.

Upon application of an electric field, according to an exemplary embodiment, the first liquid 196 is condensed while enclosing an edge portion of the pixel area. The electric field between the upper substrate 110 and the lower substrate 210 is weaker at a region adjacent to the edge electrode 192 than at a region adjacent to the first electrode 191. As an example, the same voltage as the voltage applied to the second electrode 270 is applied to the edge electrode 192, and a weaker electric field than the electric field generated between the first electrode 191 and the second electrode 270 may be formed between the edge electrode 192 and the second electrode 270. Accordingly, the first liquid 196 pushed into the portion having the relatively weak electric field by the second liquid 197 encloses the edge portion of the pixel or is arranged along the edge electrode 192.

In an exemplary embodiment, the first liquid 196 is equally positioned at the right and left sides of the pixel such that there is no difference in visibility when the display device is viewed from the right and left sides. The first liquid 196 is arranged along the edge of the pixel area, thereby assisting a light blocking member that may be formed along the gate line 121 and the data line 171 to prevent light leakage. The first liquid 196 including black oil may block light. The first liquid 196 is formed at the position where the light leakage may be generated such that the width of the light blocking member may be reduced, thereby resulting in an increase in transmittance.

Figure 5:
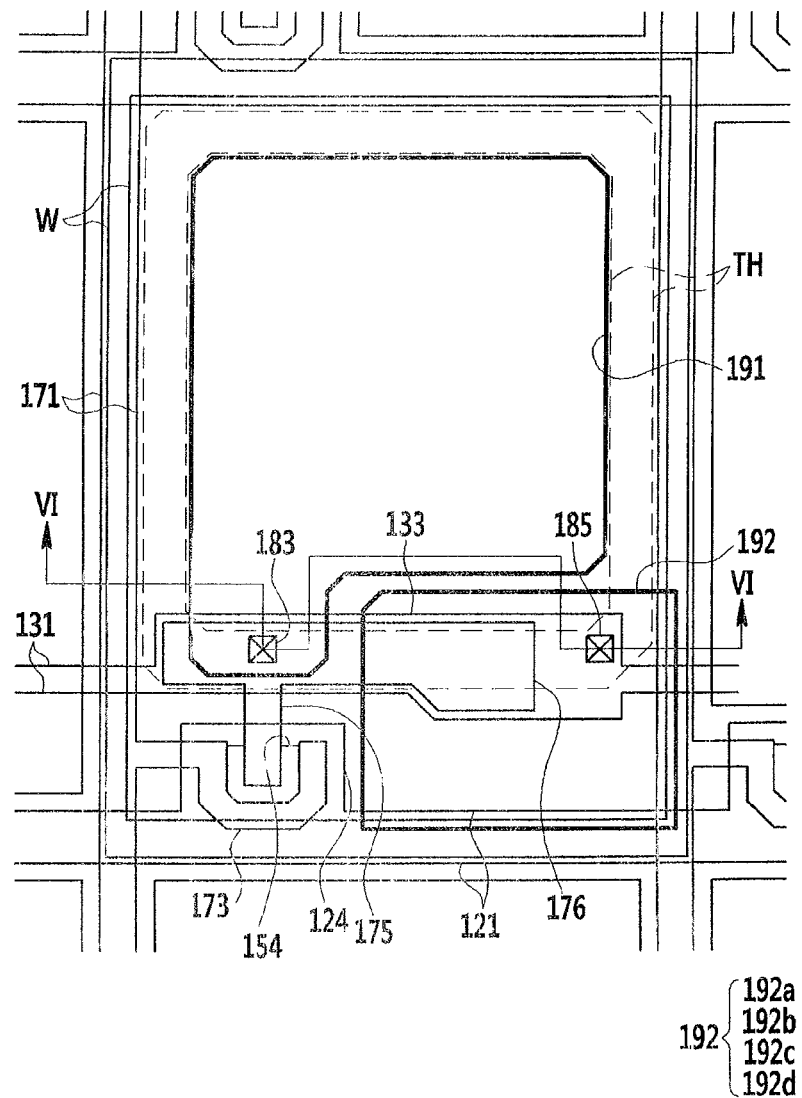
FIG. 5 is a top plan view illustrating an electrowetting device according to an exemplary embodiment of the present invention.
Figure 6:
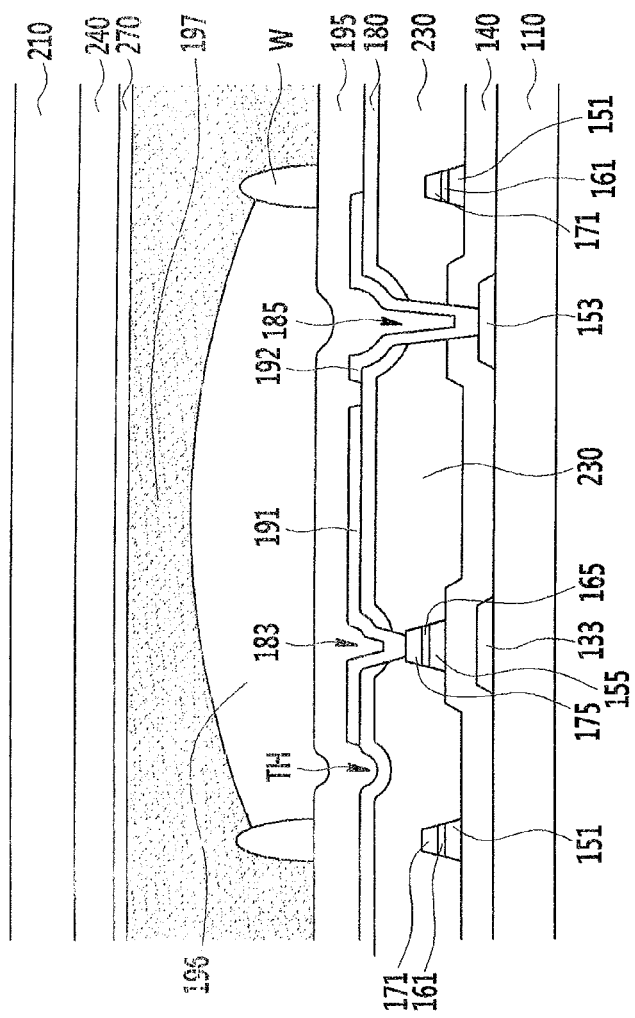
FIG. 6 is a cross-sectional view taken along the line VI-VI of FIG. 5.

FIG. 5 is a top plan view illustrating an electrowetting device according to an exemplary embodiment of the present invention. FIG. 6 is a cross-sectional view taken along the line VI-VI of FIG. 5.

The electrowetting device shown in FIG. 5 and FIG. 6 is similar to the electrowetting device shown in FIG. 1 and FIG. 2. Accordingly, differences from the electrowetting device described in connection with FIG. 1 and FIG. 2 are described.

Referring to FIG. 5 and FIG. 6, the organic layer 230, which is formed on the data line 171, the source electrode 173, the drain electrode 175, and the exposed portion of the semiconductor layer 154, has a trench TH. According to an embodiment, the trench TH is formed substantially in a quadrangle shape along a portion near an edge of the first electrode 191 in a plan view.

The passivation layer 180 is formed on the organic layer 230. According to an embodiment, the passivation layer 180 is formed of an inorganic material or an organic material having photosensitivity.

The trench TH is formed in the organic layer 230, but according to an embodiment, the trench TH is formed in the passivation layer 180 rather than the organic layer 230. Alternatively, when an inorganic insulating layer is formed under the organic layer 230, the trench TH is formed in the inorganic insulating layer.

The first electrode 191 and the edge electrode 192 are formed on the passivation layer 180. According to an embodiment, the first electrode 191 and the edge electrode 192 are formed of a transparent conductive material, such as ITO (indium tin oxide), IZO (indium zinc oxide), and IGZO (indium gallium zinc oxide).

Unlike the embodiment described in connection with FIG. 1 and FIG. 2, the edge electrode 192 according to an exemplary embodiment does not include the first portion that is included in the edge electrode and extends parallel to the data line 171 or the second portion connecting to the first portion, and includes only an electrode corresponding to the third portion. In other words, the edge electrode 192 is positioned at a corner of the pixel area, and the trench TH is formed in the insulating layer at the position corresponding to the edge electrode including the first portion and the second portion described in connection with FIG. 1 and FIG. 2.

The hydrophobic insulating layer 195 is positioned on the first electrode 191. The hydrophobic insulating layer 195 positioned on the organic layer 230 has a concave portion corresponding to the trench formed in the organic layer 230.

The upper substrate 210 is positioned to face the lower substrate 110, and the overcoat 240 is formed on the upper substrate 210. The second electrode 270 is positioned on the overcoat 240.

The first liquid 196 and the second liquid 197 are interposed between the lower substrate 110 and the upper substrate 210. The first liquid 196 is non-polar and non-conductive, and the second liquid 197 is conductive, so that the first and second liquids 196 and 197 are not mixed. The second liquid 197 has electrical conductivity.

According to an embodiment, the first liquid 196 includes black oil, and the second liquid 197 includes ultrapure water including a small amount of an electrolyte.

A partition W partitioning a pixel from other pixels is formed between the lower substrate 110 and the upper substrate 210. For convenience of description, only one pixel is shown in FIG. 1. According to an embodiment, the partition W is formed of an insulating material having a hydrophilic characteristic. The partition W receives the first liquid 196 and the second liquid 197. The partition W prevents the movement of the first liquid 196 between the pixels.

The trench TH formed in the organic layer 230 and the concave portion formed in the hydrophobic insulating layer 195 are positioned adjacent to the inner edge portion of the partition W.

Figure 7:
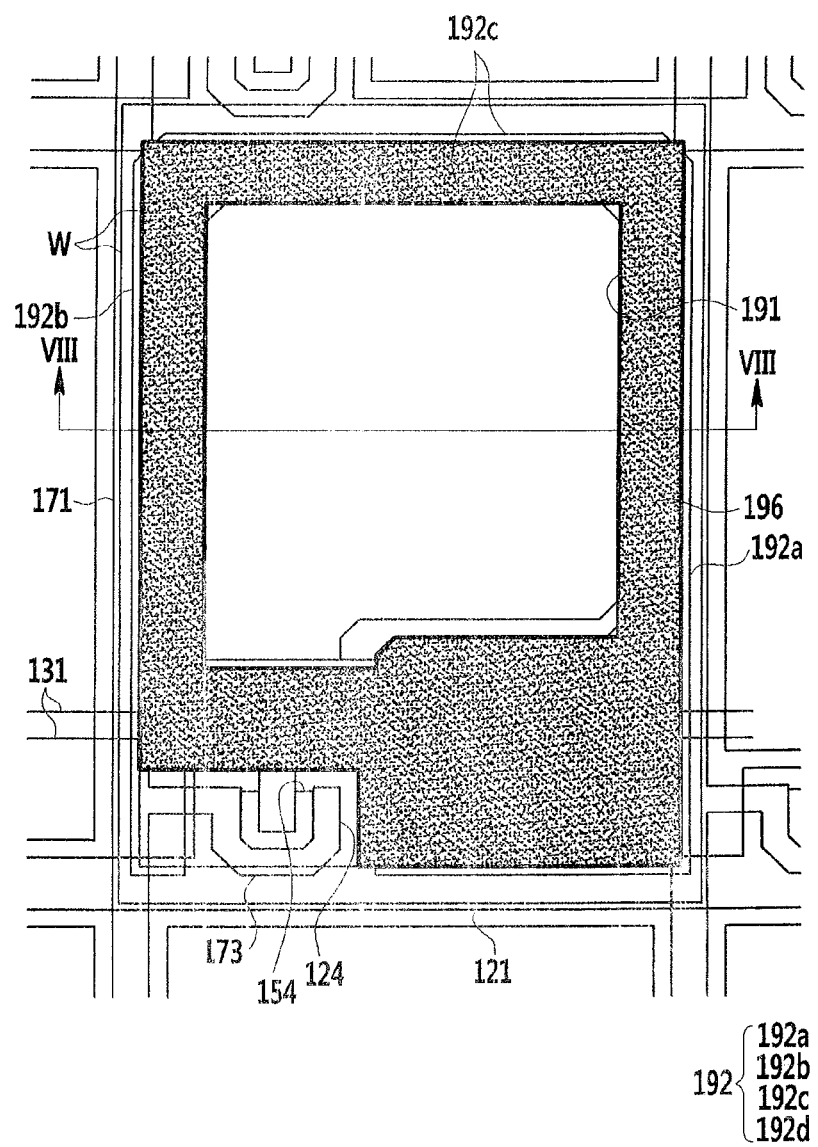
FIG. 7 is a top plan view illustrating an electrowetting device when an electric field is applied to the electrowetting device of FIG. 5.
Figure 8:
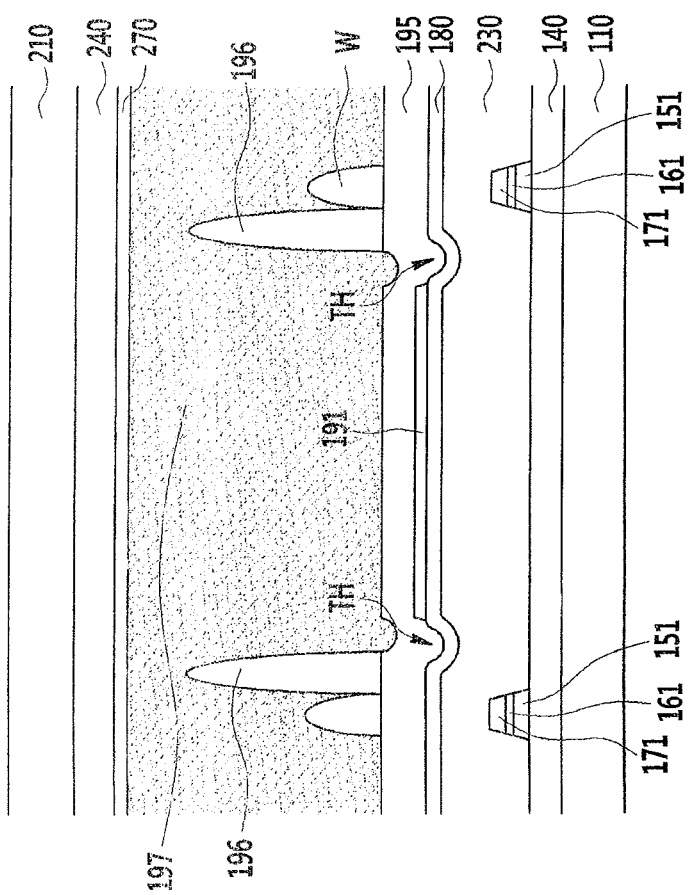
FIG. 8 is a cross-sectional view taken along the line VIII-VIII of FIG. 7.

FIG. 7 is a top plan view illustrating an electrowetting device when an electric field is applied to the electrowetting device of FIG. 5. FIG. 8 is a cross-sectional view taken along the line VIII-VIII of FIG. 7.

Referring to FIG. 6 and FIG. 7, when the first electrode 191 and the second electrode 270 are applied with voltages, the second fluid 197 is moved to contact the portion of the hydrophobic insulating layer 195, and thereby the first fluid 196 is pushed by the second fluid 197 and is collected near the partition W. Accordingly, light incident from an outside source and passing through the first substrate 110, the first electrode 191, and the hydrophobic insulating layer 195 is prevented from passing through the first fluid 196 such that light of the color corresponding to the first fluid 150 is not generated.

The first fluid 196 is moved or deformed by application of an electric field to thereby block or unblock incident light. For example, the first fluid 196 functions as a shutter.

Upon application of an electric field, according to an exemplary embodiment, the first liquid 196 is condensed while enclosing the edge portion of the pixel area. The electric field formed between the upper substrate 110 and the lower substrate 210 is weaker at a region adjacent to the trench TH than at a region adjacent to the first electrode 191. The concave portion is formed in the hydrophobic insulating layer 195 positioned on the organic layer 230 such that the first liquid 196 fills the concave portion of the hydrophobic insulating layer 195 in the absence of the electric field. When the electric field is applied, the second liquid 197 penetrates the first liquid 196 to thereby contact a portion of the hydrophobic insulating layer 195, and the first liquid 196 is pushed and is condensed into the concave portion of the hydrophobic insulating layer 195.

When the electric field is applied, the first liquid 196 flows along the concave portion of the hydrophobic insulating layer 195, and then an increasing amount of the first liquid 196 is gathered to the edge electrode 192 positioned at a corner of the pixel area. According to an embodiment, the first liquid 196 maintains a quadrangle shape along a portion adjacent to an edge of the first electrode 191.

In an exemplary embodiment, the first liquid 196 is equally positioned at the right and left sides of the pixel such that there is no difference in visibility when the display device is viewed from the right and left sides. The first liquid 196 is arranged along the edge of the pixel area, thereby assisting a light blocking member that may be formed along the gate line 121 and the data line 171 to prevent light leakage. The first liquid 196 including the black oil may block light. The first liquid 196 is formed at the position where light leakage may be generated such that the width of the light blocking member may be reduced, thereby resulting in an increase in transmittance.

While the embodiments of the invention have been described, it is to be understood that the invention is not limited to the disclosed embodiments, but, on the contrary, is intended to cover various modifications and equivalent arrangements included within the spirit and scope of the appended claims.

What is claimed is:
1. An electrowetting device comprising:
a lower substrate and an upper substrate facing each other;
an organic photosensitive passivation layer formed on the lower substrate;

a first electrode formed directly on the organic photosensitive passivation layer;
a partition on the lower substrate, wherein the partition comprises four side walls, and wherein a combination of the four side walls at least partially surrounds the first electrode;
an edge electrode that is
electrically isolated from the first electrode,
formed directly on the organic photosensitive passivation layer, and
between the first electrode and at least three of the four side walls;
a hydrophobic insulating layer on the first electrode and the edge electrode;
a second electrode on the upper substrate; and
a first liquid and a second liquid between the upper substrate and the lower substrate, wherein the first electrode is configured to generate a first electric field if a first voltage is applied to the first electrode, and wherein the edge electrode is configured to generate a second electric field weaker than the first electric field if a second voltage is applied to the edge electrode.

2. The electrowetting device of claim 1, wherein the edge electrode is positioned at the same layer as the first electrode.

3. The electrowetting device of claim 2, wherein the edge electrode is positioned along the partition.

4. The electrowetting device of claim 3, wherein the first liquid is positioned along the edge electrode if the first voltage is applied to the first electrode.

5. The electrowetting device of claim 1, further comprising:
a thin film transistor on the lower substrate; and
a color filter on the thin film transistor, wherein the first electrode and a terminal of the thin film transistor are connected with each other through a first contact hole formed through the color filter.

6. The electrowetting device of claim 5, further comprising
a storage electrode on the lower substrate, wherein the storage electrode is electrically connected to the edge electrode.

7. The electrowetting device of claim 6, wherein the edge electrode and the storage electrode are connected with each other through a second contact hole formed through the color filter.

8. The electrowetting device of claim 7, wherein the organic photosensitive passivation layer includes a planarization layer directly on the color filter.

9. The electrowetting device of claim 1, wherein the first liquid includes oil, and the second liquid includes a water-soluble fluid.

10. An electrowetting device comprising at least one pixel, the electrowetting device comprising:
a lower substrate and an upper substrate facing each other;
an insulating layer on the lower substrate;
an organic photosensitive passivation layer formed on the lower substrate;
a first electrode directly on the organic photosensitive passivation layer, wherein the first electrode is configured to form a first electric field;
a hydrophobic insulating layer on the first electrode;
a partition on the lower substrate, wherein the partition partitions the pixel from other pixels;
a second electrode on the upper substrate;
an edge electrode directly on the organic photosensitive passivation layer, wherein the edge electrode is adjacent to a corner of the first electrode, and wherein the edge electrode is electrically isolated from the first electrode; and
a first liquid and a second liquid between the upper substrate and the lower substrate, wherein the insulating layer includes a trench configured to shape a second electric field that is weaker than the first electric field, wherein the trench is (i) at a region adjacent to an inner edge portion of the partition and (ii) at a periphery of the pixel.

11. The electrowetting device of claim 10, wherein the first liquid is positioned along the trench when a voltage is applied to the first electrode and the second electrode.

12. The electrowetting device of claim 11, wherein the trench is positioned along the partition.

13. The electrowetting device of claim 10, wherein the insulating layer is a color filter.

14. The electrowetting device of claim 13, wherein the organic photosensitive passivation layer includes a planarization layer directly on the color filter.

15. The electrowetting device of claim 10, further comprising a color filter on the lower substrate, wherein the insulating layer is positioned on the color filter.

16. The electrowetting device of claim 10, further comprising:
a thin film transistor on the lower substrate; and
a color filter on the thin film transistor, wherein the first electrode and a terminal of the thin film transistor are connected with each other through a first contact hole formed through the color filter.

17. The electrowetting device of claim 13, further comprising a storage electrode on the lower substrate, wherein the storage electrode is electrically connected to the edge electrode.

18. The electrowetting device of claim 17, wherein the edge electrode and the storage electrode are connected with each other through a second contact hole formed through the color filter.

19. The electrowetting device of claim 18, wherein the organic photosensitive passivation layer includes a planarization layer directly on the color filter.

20. The electrowetting device of claim 10, wherein the first liquid includes oil, and the second liquid includes a water-soluble fluid.

21. The electrowetting device of claim 1, wherein a substantial portion of the edge electrode is in the same plane as a substantial portion of the first electrode.

* * * * *